United States Patent [19]

Katayama et al.

[11] Patent Number: 5,091,857
[45] Date of Patent: Feb. 25, 1992

[54] DRIVING FORCE CONTROL SYSTEM

[75] Inventors: Yoshinori Katayama, Atsugi; Terukiyo Murakami, Yokohama; Hiroyuki Asano, Tokyo; Yuichi Abe, Yokohama; Haruhiko Iizuka, Yokosuka; Kazuaki Shimizu, Tokyo; Yoshio Fukai, Sagamihara, all of Japan

[73] Assignee: Nissan Motor Company, Ltd., Japan

[21] Appl. No.: 220,208

[22] Filed: Jul. 18, 1988

[30] Foreign Application Priority Data

Jul. 16, 1987 [JP] Japan .............................. 62-178475
Dec. 22, 1987 [JP] Japan .............................. 62-193400

[51] Int. Cl.⁵ .......................... B60K 41/20; F02D 45/00
[52] U.S. Cl. ........................ 364/431.09; 364/426.01; 364/424.1; 123/325; 123/198 DB; 303/100; 180/284
[58] Field of Search ............... 364/426.01, 431.09, 364/424.1, 431.03, 431.04; 123/325, 326, 198 DB; 180/284; 303/100, 105, 109

[56] References Cited

U.S. PATENT DOCUMENTS

| 3,430,436 | 3/1969 | Bader et al. | 123/325 |
| 4,192,279 | 3/1980 | Maisch et al. | 123/325 |
| 4,305,365 | 12/1981 | Iizuka et al. | 123/325 |
| 4,391,243 | 7/1983 | Bessho | 123/325 |
| 4,414,937 | 11/1983 | Ueda et al. | 123/198 DB |
| 4,539,643 | 9/1985 | Suzuki et al. | 364/431.05 |
| 4,717,207 | 1/1988 | Kubota et al. | 303/100 |
| 4,899,280 | 2/1990 | Onari et al. | 364/431.05 |

Primary Examiner—Parshotam S. Lall
Assistant Examiner—V. Trans
Attorney, Agent, or Firm—Lowe, Price, Leblanc & Becker

[57] ABSTRACT

There is proved a driving force control system which comprises device for measuring operating state of the vehicle brake system and generating an output signal, and device for controlling a driving force upon a predetermined condition being fulfilled after the output signal has indicated a predetermined operating state of the vehicle brake system.

27 Claims, 13 Drawing Sheets

FIG.3
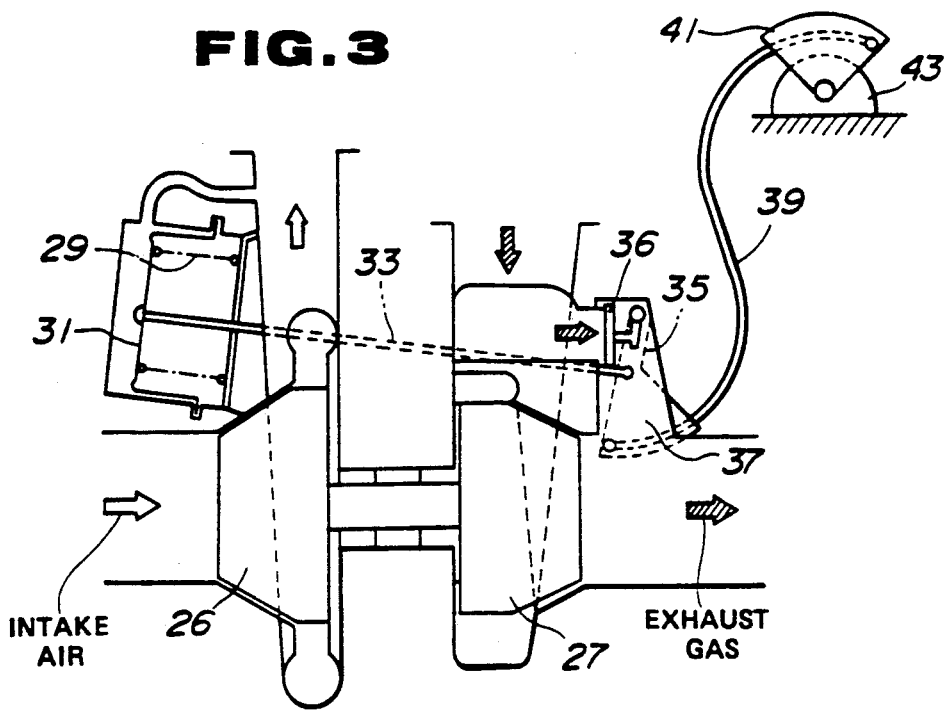
FIG.4
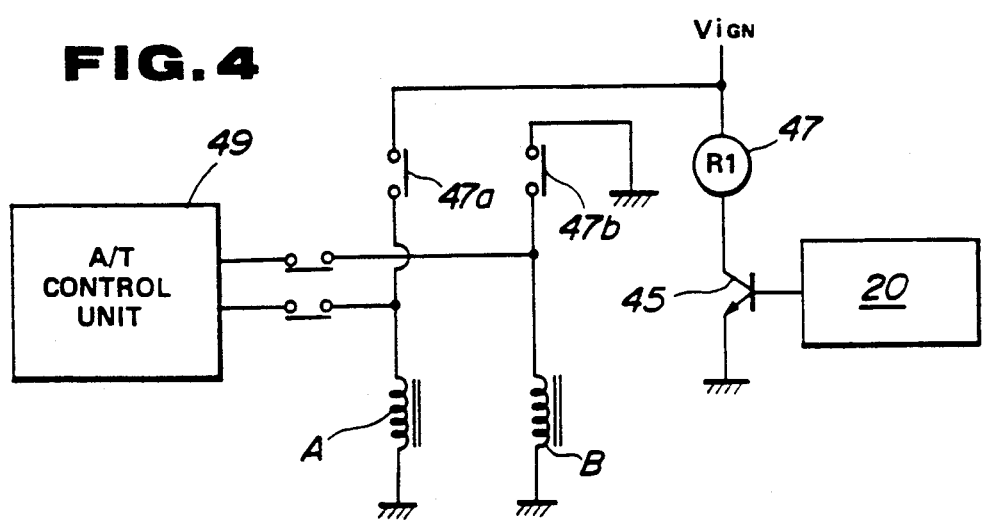
FIG.5
| GEAR | SHIFT SOL. A | SHIFT SOL. B |
|---|---|---|
| 1ST | O | O |
| 2ND | X | O |
| 3RD | X | X |
| 4TH | O | X |
O --- ON
X --- OFF

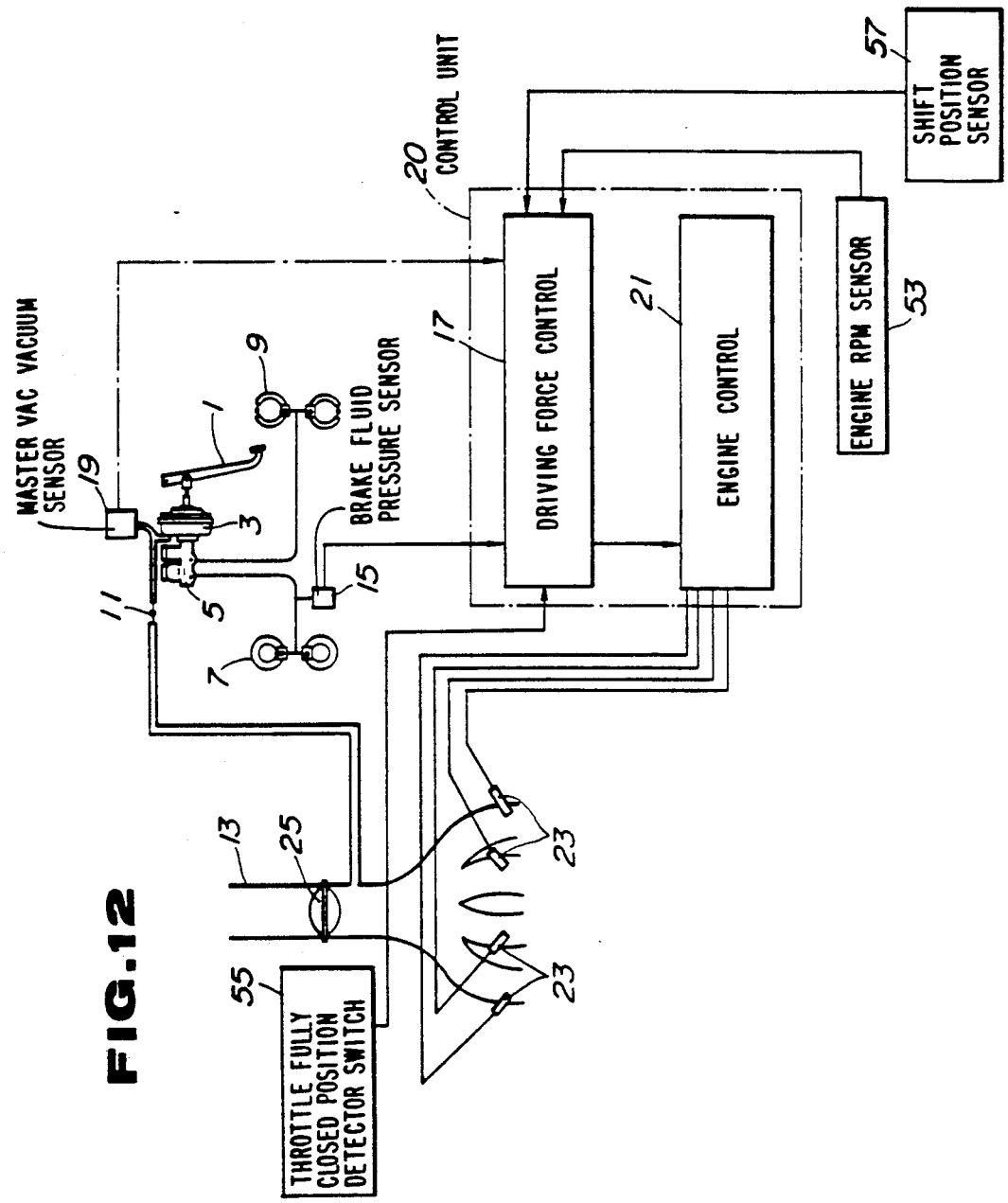

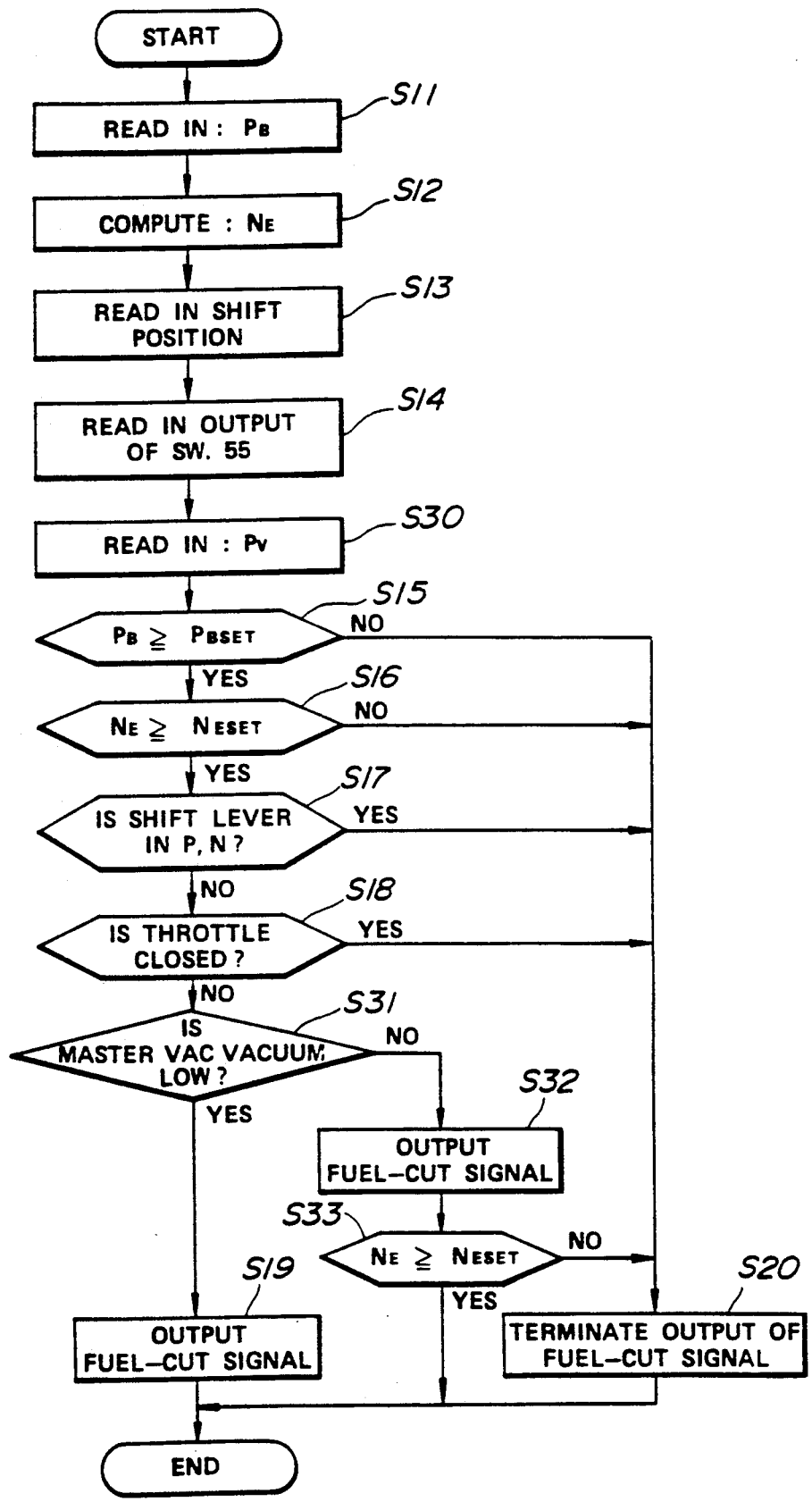

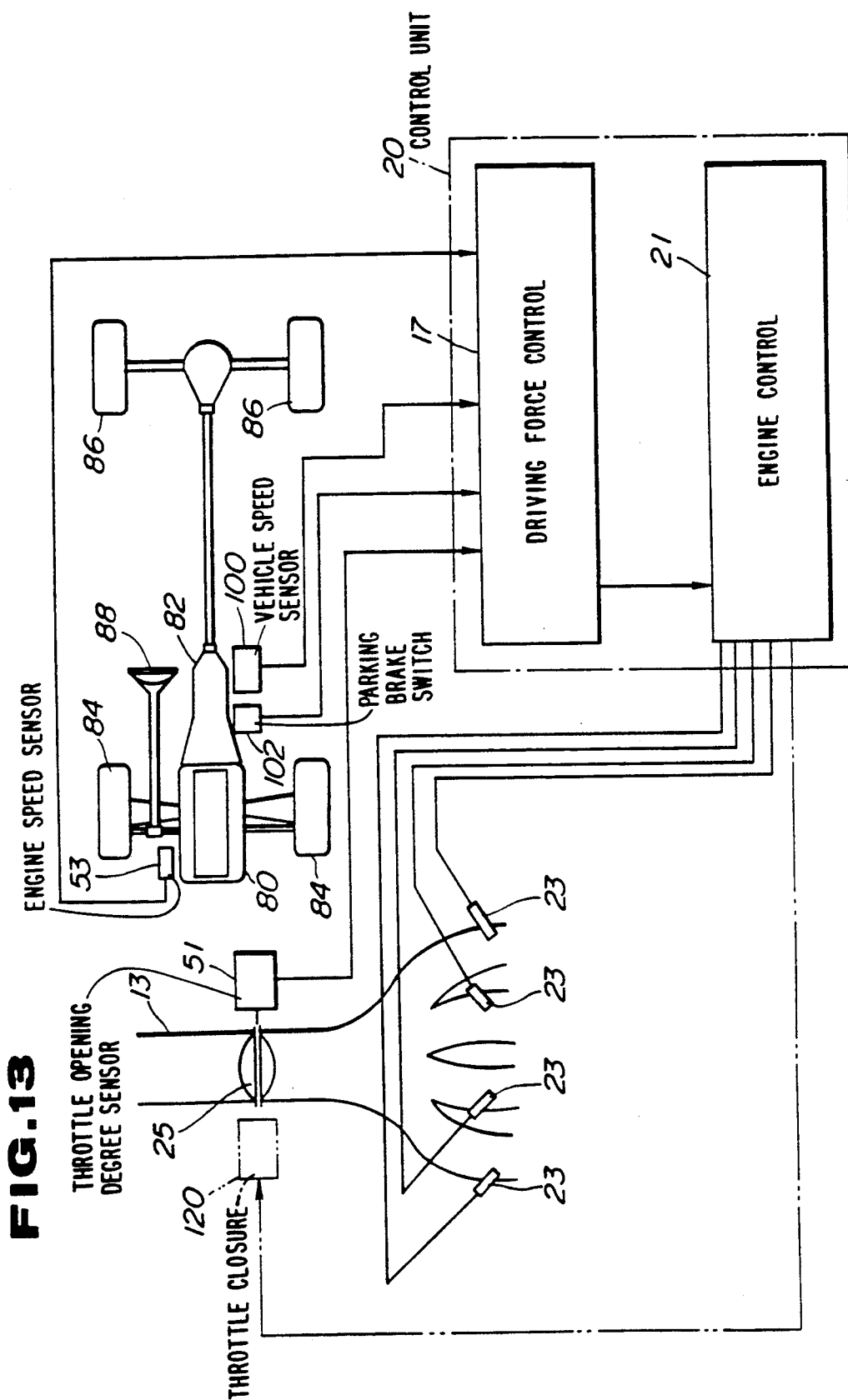

DRIVING FORCE CONTROL SYSTEM

BACKGROUND OF THE INVENTION

The present invention relates to a vehicle control system and more particularly to a driving force control system for causing a reduction in driving force in response to brake demand or intention.

Driver's power demand on an automotive vehicle is detected by depression of or force exerted on an accelerator pedal. Likewise, driver's brake demand is detected by depression of or force exerted on a brake pedal of a brake system, or the state of a manual parking brake. Among various types of hydraulic brake systems, there is known a brake system which uses as a brake booster Master Vac (a trade name). The Master Vac is installed between a brake pedal and a master cylinder and uses a pressure differential between the engine manifold vacuum and the atmospheric pressure to activate an output rod. Via an input rod, brake pedal effort is transmitted to the output rod, and the output rod utilizes the movement of the input rod and the force of a power piston subject to the above mentioned pressure differential to apply force to the master cylinder piston. In order to minimize the transmission of a change in engine manifold vacuum to a vacuum chamber on one side of a power cylinder, there is provided a check valve between the engine intake manifold and Master Vac thereby to keep the vacuum within the vacuum chamber. However, the vacuum within the Master Vac tends to disappear during driving with a so-called heel and toe driving technique. During the driving with heel and toe technique, the depression of the brake pedal is repeated with the accelerator pedal kept depressed. Under this driving condition, since there is no introdction of new vacuum from the engine intake manifold to the vacuum chamber on one side of the power piston and the introduction of atmospheric air into the atmospheric chamber on the other side of the power piston is repeated, the vacuum within the Master Vac tends to disappear gradually. As a result, the function as the brake booster will disappear. In this case, the driver has to depress the brake pedal with a greater brake effort than the normal case to provide the same braking effect.

An object of the present invention is to provide a driving force control system for an automotive vehicle which automatically controls driving force to meet brake demand or intention. Thus, for example, even if a brake booster ceases its operation, effective braking is provided with reasonable brake effort.

SUMMARY OF THE INVENTION

According to the present invention, there is provided a system for an automotive vehicle which controls a driving force to meet a brake demand or intention thereby to cause the vehicle to obey the brake demand.

More specifically, according to the present invention, there is provided a driving force control system which comprises means for measuring operating state of the vehicle brake system and generating an output signal, and means for controlling a driving force upon a predetermined condition being fulfilled after the output signal has indicated a predetermined operating state of the vehicle brake system.

BRIEF DESCRIPTION OF THE DRAWINGS

FIG. 3 is a view showing a portion of a second embodiment of a driving force control system according to the present invention;

FIG. 4 is a circuit diagram showing a portion of a third embodiment of a driving force control system according to the present invention;

FIG. 5 is a table showing operations of shift solenoids with respect to gear or shift positions established in an automatic transmission used in the third embodiment;

FIG. 12 is a schematic diagram of an eighth embodiment of a driving force control system according to the present invention;

FIG. 12A is a flow chart of a control program stored in a control unit shown in FIG. 12;

FIG. 13 is a schematic diagram of a ninth embodiment of a driving force control system according to the present invention.

DETAILED DESCRIPTION OF THE INVENTION

Figure 1:
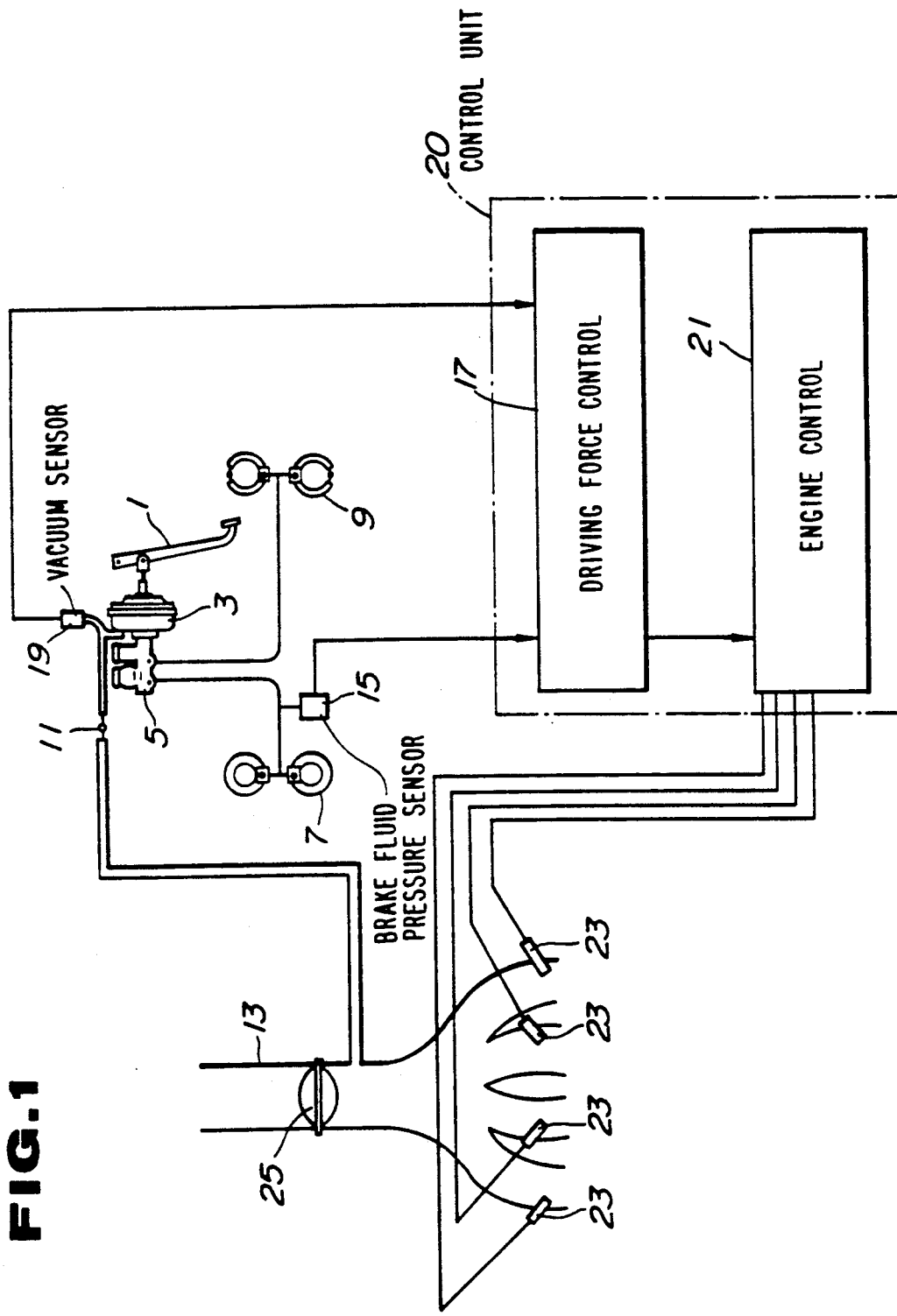
FIG. 1 is a schematic diagram of a first embodiment of a driving force control system according to the present invention.

FIG. 1 shows a first embodiment of a driving force control system according to the present invention. This driving force control system is designed to be used in an automotive vehicle which includes a brake system and a fuel injection multi-cylinder internal combustion engine. As is well known, the brake system includes a brake pedal 1, a brake booster 3 in the form of Master Vac (a trade name), and a master cylinder 5. When the brake pedal is depressed, brake fluid pressure is delivered from the master cylinder 5 to front brakes 7 and also to rear brakes 9. The Master Vac 3 is a vacuum type servo device and includes a power piston with an input rod operatively connected to the brake pedal 1 and an output rod connected to a master cylinder piston disposed in the master cylinder 5. The Master Vac 3 has a vacuum connection to the engine intake manifold 13 to admit intake manifold vacuum to a vacuum chamber defined in the Master Vac 3 by the power piston. A check valve 11 is provided to prevent air flow from the intake manifold 13 to the Master Vac 3.

In this embodiment, in order to detect the operating state of the brake system, there are provided two sensors, namely, a brake fluid pressure sensor 15 and a vacuum sensor 19. The brake fluid pressure sensor 15 is so arranged as to measure brake fluid pressure and generates an output signal $P_B$ indicative of the brake fluid pressure measured. The vacuum sensor 19 is so arranged as to measure the magnitude of vacuum applied to the Master Vac 3 and generates an output signal $P_V$ indicative of the vacuum measured.

The output signals of these sensors 15 and 19 are supplied to a control unit 20 of a microcomputer based engine control system known as Electronic Concentrated engine Control System (abbreviated as ECCS) and manufactured in Japan by NISSAN MOTOR COMPANY LIMITED. Briefly, this engine control system has a function to determine the amount of fuel to be injected by each of fuel injectors 23 in response mainly to an air flow indicative output signal of an air flow meter and an engine speed indicative output signal of a crank angle sensor. It also has a so-called fuel out function. For full understanding of this engine control system, reference should be made to SERVICE PERIODICAL June 1987 No. 578 entitled "INTRODUCTION OF NISSAN CEDRIC & GLORIA E-Y31, E-PY31, E-PAY31, Q-UY31" published by NISSAN MOTOR COMPANY LIMITED in 1987, particularly pages B-58 to B-67.

According to this embodiment of the driving force control system, the control unit 20 performs a driving force control (see block 17) in addition to the engine control mentioned above (see block 21). Briefly explaining the operation, when the brake pedal 1 is kept depressed beyond a predetermined period of time, a fuel cut is instructed and the fuel injection is suspended, causing the engine to stop production of engine torque, providing an effective engine brake running, thus inducing a drop in driving force. As a result, since the driving force is lowered, there is provided effective braking with the brake pedal 1 being depressed less deeply. This assures effective braking without the driver's effort of depressing the brake pedal more deeply than necessary even if the function of the Master Vac 3 gradually disappears during a so-called heel and toe driving. As a result, the driver can continue to control the vehicle without any feeling of fatigue because he/she can recognize effective braking as if the Master Vac 3 was in the normal operating state.

The microcomputer which forms a main part of the control unit 20 comprises a central processing unit (CPU), a read only memory (ROM), a ramdom access memory (RAM) and an input output interface (I/O). The ROM of the control unit 20 of this embodiment contains a control program as illustrated by the flow chart of FIG. 2. The operation of this embodiment is described more specifically along with the flow chart of FIG. 2.

Figure 2:
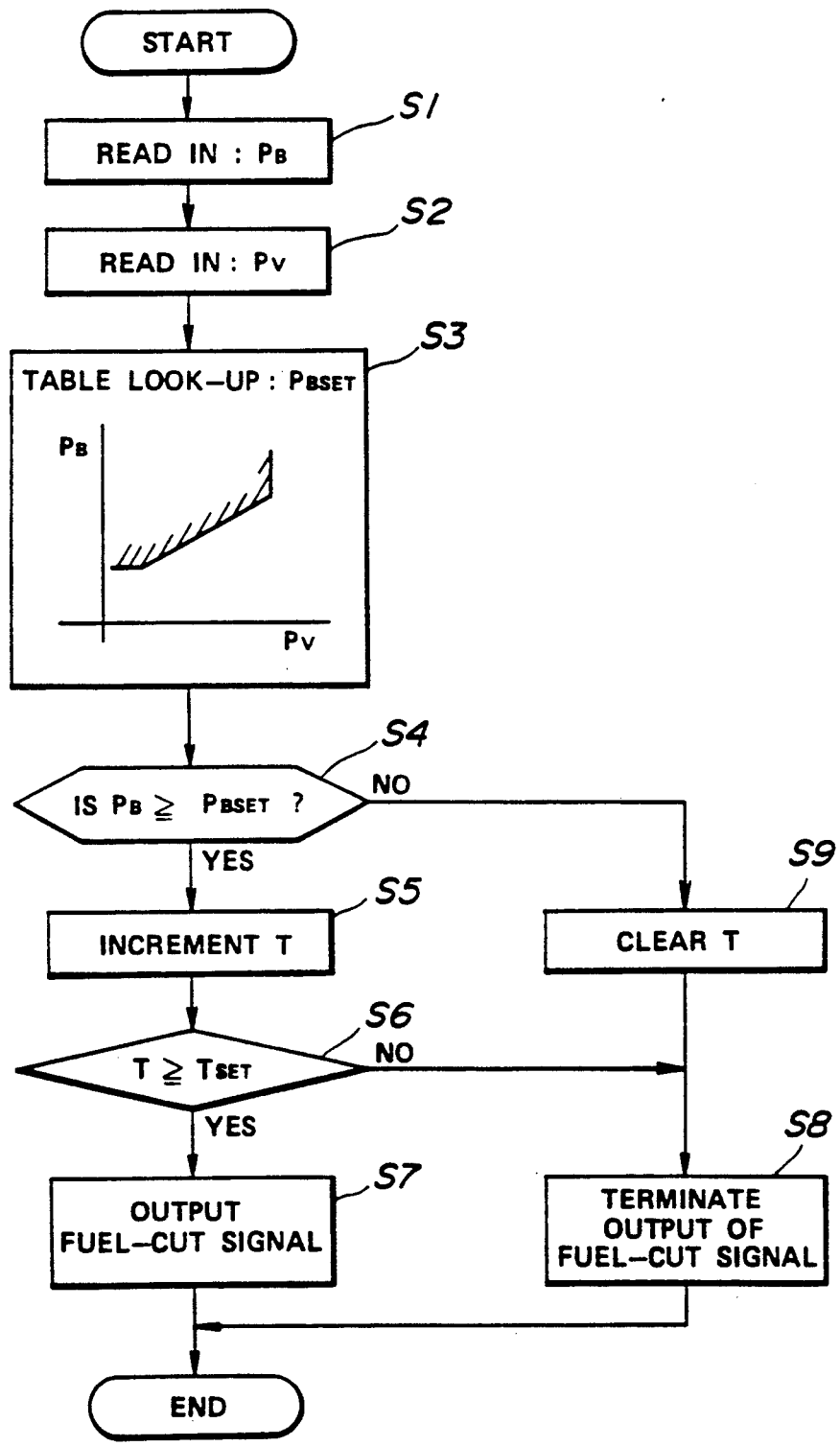
FIG. 2 is a flow chart of a control program stored in a control unit shown in FIG. 1.

Referring to FIG. 2, the execution of this flow chart is repeated after a predetermined time has elapsed. The output signals of the brake fluid pressure sensor 15 and vacuum sensor 19 are converted into digital signals before passing through the I/O. These digital signals are stored at predetermined addresses in the RAM as information indicative of a brake fluid pressure $P_B$ and indicative of a master brake fluid pressure $P_B$ and indicative of a master Vac vacuum $P_V$, respectively, at read-in steps S1 and S2.

At the ROM, there is stored a retrievable table map as illustrated at step S3. This table map contains data, each representative of a brake fluid pressure preset value $P_{BSET}$ as a function of each value of Master Vac vacuum $P_V$. As illustrated by the fully drawn line in the table illustrated, the brake fluid pressure preset value $P_{BSET}$ is relatively high at high magnitude of Master Vac vacuum $P_V$. However, the brake fluid pressure preset value $P_{BSET}$ decreases as the Master Vac vacuum $P_V$ decreases. In other words, the brake fluid pressure preset value $P_{BSET}$ is relatively high when the servo action by the Master Vac 3 is available, but it decreases as the servo action by the Master Vac 3 becomes weak.

At step S3, the table look-up operation of the illustrated table map is performed to determine a brake fluid pressure preset value $P_{BSET}$ for the actual Master Vac vacuum value $P_V$ stored at the read-in step S2. At the subsequent step S4, the brake fluid pressure value $P_B$ stored at the read-in step S1 is compared with the above-mentioned preset value $P_{BSET}$. More specifically, an inquiry is made at the comparison step S4 whether the brake fluid pressure $P_B$ is greater than or equal to the preset value $P_{BSET}$. If the brake fluid pressure $P_B$ falls in a region shadowed in the table map illustrated at the step S3 and thus greater than or equal to the preset value $P_{BSET}$, the program proceeds to step S5 where the content of a timer T is increased by a predetermined single unit, and then it is judged whether the content of the timer T is greater than or equal to a preset timer value $T_{SET}$ or not. If the condition that $P_B$ is greater than $P_{BSET}$ has continued for a predetermined time as represented by the preset timer value $T_{SET}$, the program proceeds from step S6 to step S7 where a fuel-cut signal in outputted. In response to the output of the fuel-cut signal, the control unit 20 performs fuel-cut function to suspend fuel injection via fuel injectors 23, causing the engine to cease production of engine torque, thus inducing a drop in driving force. This assures effective braking performance.

If at step S4 the brake fluid pressure $P_B$ stored at the read-in step S1 is less than the preset value $P_{BSET}$, the program proceeds from the step S4 to step S9 where the content of the timer T is cleared and then to step S8 where the output of fuel-cut signal is terminated. Thus, if the fuel injection is being suspended, the control unit 20 resumes the fuel injection.

If the condition that $P_B$ is greater than or equal to $P_{BSET}$ has not yet continued for the predetermined time, the program proceeds from step S6 to the above-mentioned step S8.

When the driver depresses the accelerator pedal with his/her heel while having his/her toe placed on the brake pedal 1 during driving with so-called heel and toe driving technique, the throttle valve 25 is opened and the magnitude of intake manifold vacuum becomes zero or substantially zero. Under this condition, there remains vacuum within the Master Vac 3 owing to the action of the check valve 11 initially, but if a cycle of depression and release of the brake pedal 1 is repeated, the vacuum within the Master Vac 3 will decrease owing to pumping action caused by open close operation of a vacuum valve and an air valve which are usually provided in the Master Vac 3. Thus, since the brake fluid pressure preset value $P_{BSET}$ decreases in response to the decrease of the vacuum within the Master Vac 3, the inquiry made at step S4 becomes positive at a relatively low brake fluid pressure $P_B$.

If this state wherein the brake fluid pressure $P_B$ is greater than or equal to the brake fluid pressure preset value $P_{BSET}$ has continued beyond the preset time represented by the preset timer $T_{SET}$, the control unit 20 performs fuel-cut operation to suspend fuel injection to the engine, inducing a drop in driving force, thus assuring effective braking. As a result, effective braking is assured even if the servo action by the Master Vac 3 decreases. Besides, this effective braking is assured with a reasonable force exerted on the brake pedal 1 even if the servo action by the Master Vac 3 disappears, thus considerably alleviating the degree of fatigue recognuized by the driver.

In the previously derscribed embodiment, the fuel-cut operation is performed in order to cause a temporary drop in driving force. Alternatively, in the case of a vehicle powered by a turbo charged engine, a waste gate may be opened to cause exhaust gas to bypass a turbine rotor of the turbo charger thereby to cause a temporary drop in driving force. In the case of a vehicle installed with an automatic transmission, the automatic transmission may be shifted up to the smallest gear ratio thereby to cause a temporary drop in driving force.

The above-mentioned two alternatives are specifically described with reference to FIGS. 3 to 5.

Referring to FIG. 3, a second embodiment of a driving force control system is described. This embodiment is substantially the same as the first embodiment except that the contents of steps S7 read "OUTPUT WASTE GATE OPEN SIGNAL" and "TERMINATE OUTPUT OF WASTE GATE OPEN SIGNAL", respectively, and a control unit 20 is responsive to a waste gate open signal to open a waste gate 36 of a turbo charger shown in FIG. 3. As shown in FIG. 3, the turbo charger comprises a compressor impeller 26 and a turbine rotor 27 drivingly connected to the impeller 26. In operation of the engine, exhaust gas from the engine imparts a force to turn the turbine rotor 27. Turning of the turbine rotor 27 causes the compressor impeller 26 to turn thereby to charge the engine with compressed intake air. The amount of intake air charged to the engine increases as the flow of exhaust gas passing through the turbine rotor 27 increases. In order to prevent an excessive rise in pressure at which the intake air is admitted to the engine, the waste gate 36 is opened by an actuator 40 including a diaphragm 31 preloaded by a return spring 29. The diaphragm 31 is always exposed to the pressure at which the intake air is admitted to the engine so that if the pressure is subject to an excessive rise, the diaphragm 31 is deflected toward the right as viewed in FIG. 3 against the bias of the return spring 29. This movement of the diaphragm 31 is transmitted via a connecting rod 33 to an arm 35 of the waste gate 36, causing the arm 35 to swing counterclockwise as viewed in FIG. 3. This swinging movement of the arm 35 causes the waste gate 36 to move to its open position, thus providing the bypass passage for exhaust gas. According to this embodiment, a first drum 37 is formed integral with the arm 35 of the waste gate 36. This drum 37 is operatively connected via a suitable flexible force transmitter 39, such as a wire, to a second drum 41 which is actuable by a motor 43. Under the control of a control unit 20 (see FIG. 1), the motor 43 drives the second rotor 41 such that when the above mentioned waste gate open signal is outputted, the motor 43 rotates the second drum 41 clockwise as viewed in FIG. 3, causing the first drum 37 to turn clockwise to rotate the arm 35 against the action of the return spring 29 counterclockwise, thus causing the waste gate 36 to open to cause exhaust gas to bypass the turbine rotor 27. As a result, exhaust pressure exerted to the turbine rotor 27 becomes substantially zero and the turbo action becomes nil, causing the engine to reduce engine torque thereby to induce a drop in driving force. When the output of the waste gate open signal disappears, the waste gate 36 returns to its closed position due mainly to the action of the return spring 29.

Referring to FIGS. 4 and 5, a third embodiment of a driving force control system according to the present invention is described. According to this embodiment, the present invention is embodied in an automatotive vehicle installed with an automatic transmission which is shiftable to any one of four forward gears in response to a change in combination of ON and OFF states of two shift solenoids, namely, a shift solenoid A and a shift solenoid B, under the control of an automatic transmission control unit 49. This automatic transmission is of the RE4R01A type manufactured in Japan by NISSAN MOTOR COMPANY LIMITED and described in SERVICE PERIODICAL June 1987 No. 578 entitled "INTRODUCTION OF NISSAN CEDRIC & GLORIA E-Y31, E-PY31, E-PAY31, Q-UY31" published by NISSAN MOTOR COMPANY LIMITED in 1987, particularly pages C-11 to C-61. FIG. 5 shows a table illustrating the relationship between four combinations of ON and OFF states of the shift solenoid A and B for establishing four forward gears, namely 1st, 2nd, 3rd and 4th speeds, in the automatic transmission.

This third embodiment is substantially the same as the first embodiment except that the contents of steps S7 and S8 of the flow chart shown in FIG. 2 read "OUTPUT FORCED UPSHIFT SIGNAL" and "TERMINATION OF OUTPUT OF FORCED UPSHIFT SIGNAL", respectively, and the provision of a relay circuit including a switching element 45 in the form of a transistor for example which is rendered ON in response to the forced upshift signal. The relay circuit also includes a relay 47 with two sets of normally open relay contacts 47a and 47b, and a source of electric power $V_{iGN}$. The transistor 45 is of the npn type and has an emitter grounded, a base where a predetermined voltage is applied in response to the forced upshift signal and a collector which one end of the relay 47 is connected to. The opposite end of the relay 47 is connected to the source of electric power $V_{iGN}$. The first set of normally open relay contacts 47a is connected between the shift solenoid A and the source of electric power so that electric current is allowed to pass through the shift solenoid A to energize same whenever the first set of normally open relay contacts 47a is closed in response to energization of the relay 47. The second set of normally open relay contacts 47b is disposed between the shift solenoid B and the ground so that both terminals of the shift solenoid B are grounded to deenergize same whenever the second set of normally open relay contacts 47b is closed in response to energization of the relay 47. From the previous description, it is readily understood that the output of forced upshift signal renders the transistor 45 ON, allowing current to pass through the relay 47 to energize same, closing both the first and second sets of normally open relay contacts 47a and 47b, thus energizing the shift solenoid A and deenergizing the other shift solenoid B. This causes the automatic transmission to shift to the 4th gear having the smallest gear ratio as will be readily understood from the bottom row of the Table shown in FIG. 5. As a result, the driving torque of the vehicle drops to cause a reduction in driving force.

Figure 6:
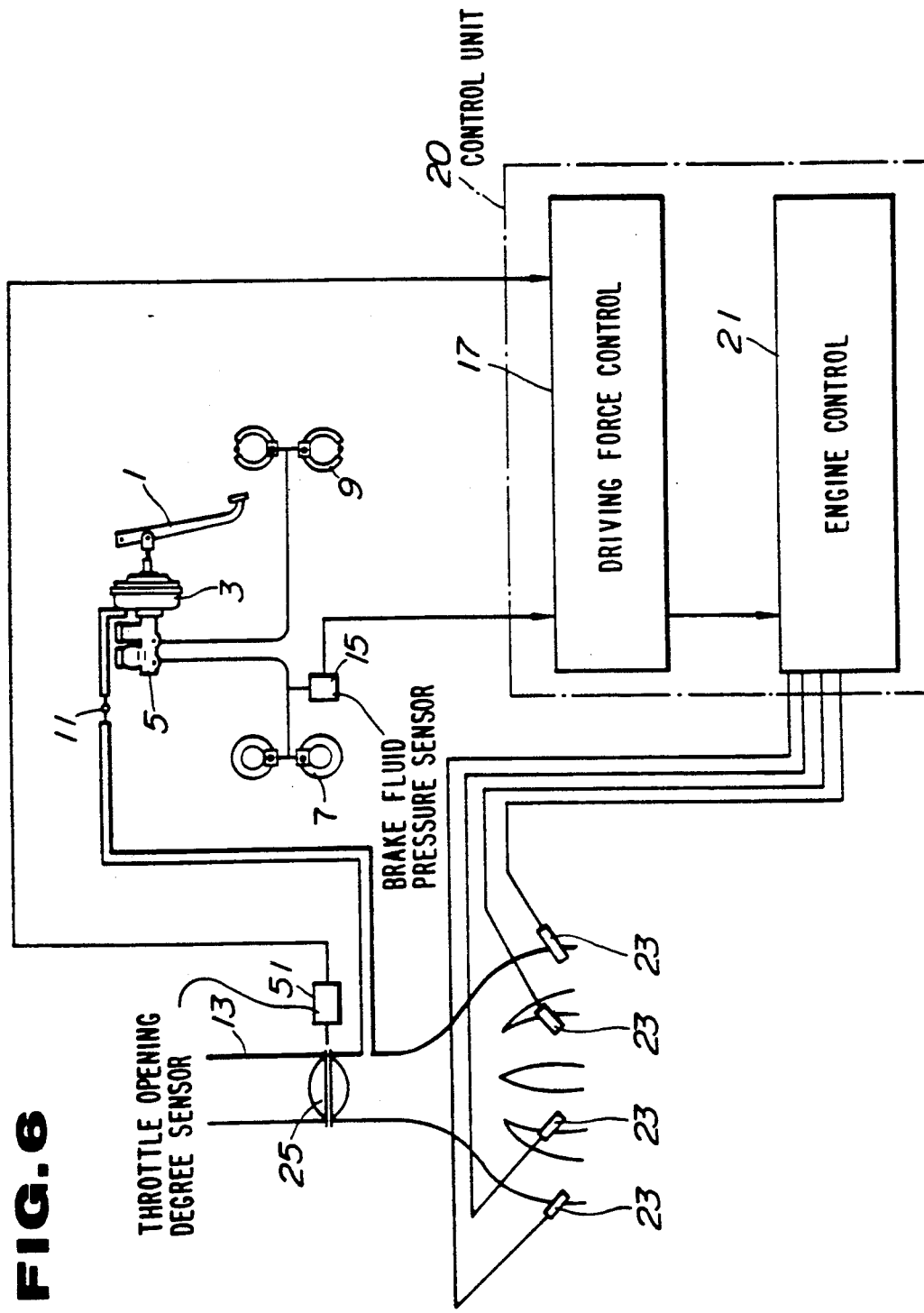
FIG. 6 is a schematic diagram of a fourth embodiment of a driving force control system according to the present invention.
Figure 7:
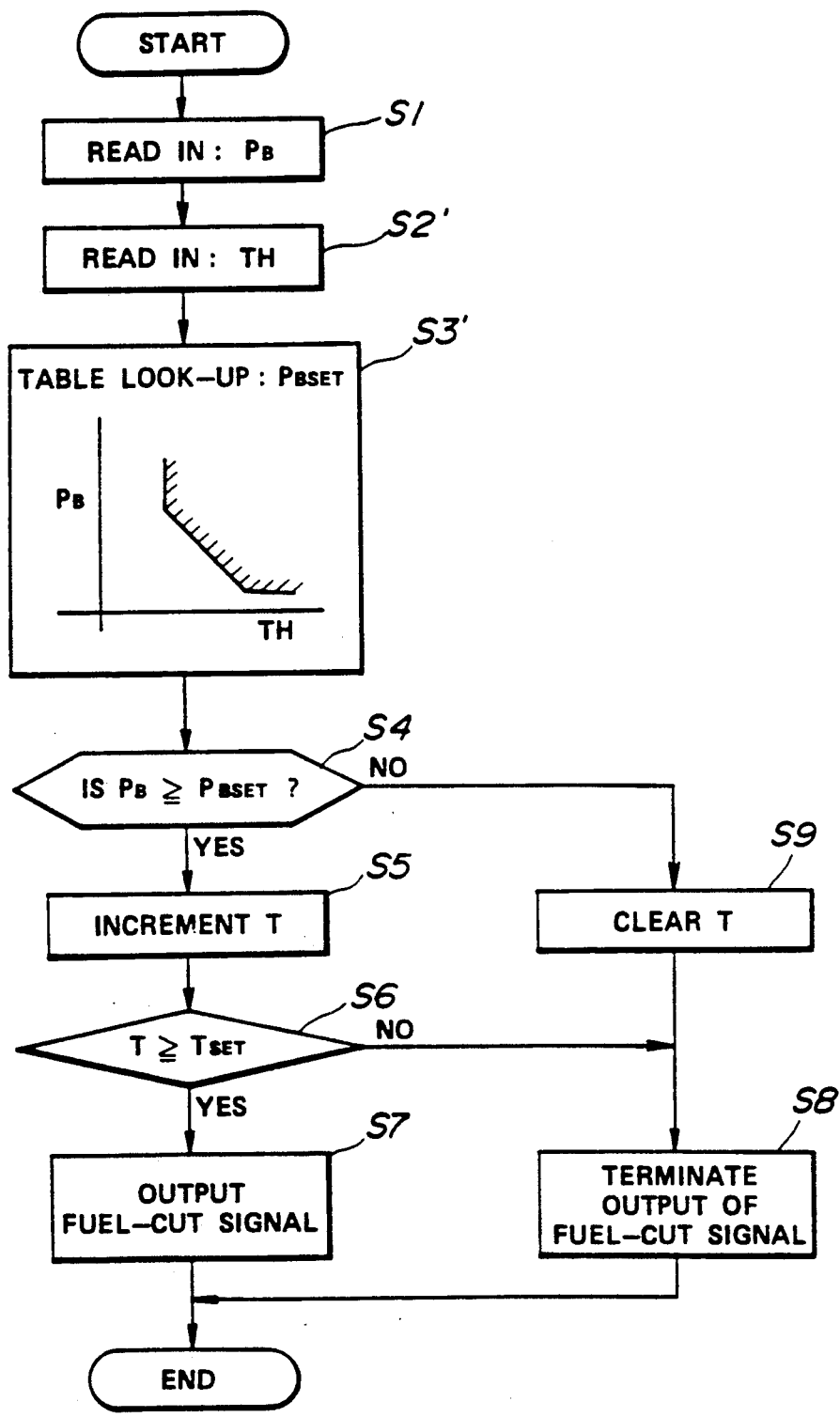
FIG. 7 is a flow chart of a control program stored in a control unit shown in FIG. 7.

Referring to FIGS. 6 and 7, a fourth embodiment of a driving force control system according to the present invention is described. This embodiment is substantially the same as the first embodiment shown in FIG. 1 except the provision of a throttle opening degree sensor 51 instead of the Master Vac vacuum sensor 19. The throttle opening degree sensor 51 measures opening degree of a throttle valve 25 and generates an output signal TH indicative of the throttle opening degree measured. The output signal of this throttle opening degree sensor 51 and the output signal $P_B$ of the brake fluid pressure sensor 15 are fed to a control unit 20 of a microcomputer based control system. This control unit 20 is substantially the same as that of the first embodiment except the fact that its read only memory (ROM) stores a control program illustrated by a flow chart shown in FIG. 7 instead of the control program illustrated by the flow chart shown in FIG. 2.

The operation of this embodiment is described along with the flow chart shown in FIG. 7.

This flow chart is substantially the same as that of FIG. 2 except the fact that new steps S2' and S3' have replaced the steps S2 and S3, respectively. What is intended by the flow chart shown in FIG. 7 is to effect the fuel-cut operation when the brake fluid pressure $P_B$ is relatively low when the engine produces a relatively high output as represented by a relatively large throttle opening degree TH. This is because subtracting engine output from braking force corresponding to force exerted on brake pedal results in effective braking force and thus it is necessary to decrease engine output thereby to increase effective braking force by carrying out fuel-cut when the engine output is at a high level. The throttle opening degree TH is used in this embodiment as a signal indicative of the magnitude of engine output. Alternatively, an output signal of an engine intake manifold vacuum sensor may be used. If desired, based on the output signals of the throttle opening degree sensor and the engine speed sensor, engine output is calculated at an engine output computing circuit and the output signal of this circuit is supplied to the control unit 20 in the place of the throttle opening degree indicative signal TH.

Referring to the flow chart shown in FIG. 7, the execution of this flow chart is repeated after a predetermined time has elapsed. After being converted into digital signals, the output signals of the brake fluid pressure sensor 15 and throttle opening degree sensor 51 are stored at predetermined addresses in RAM of the control unit 20 as information indicative of a brake fluid pressure $P_B$ and indicative of a throttle opening degree TH, respectively at read-in steps S1 and S2'. There is stored at ROM a retrievable table map as illustrated at step S3'. This table map contains data, each representative of a brake fluid pressure reference value $P_{BSET}$ as a function of each value of throttle opening degree TH. As illustrated by the fully drawn line in the table, the brake fluid pressure reference value $P_{BSET}$ decreases as the throttle opening degree TH increases. At step S3', the table look-up operation of the illustrated table map is performed to determine a brake fluid pressure reference value $P_{BSET}$ for the actual throttle opening degree value TH stored at read-in step S2'. The operations at the other steps are the same as the counterparts in FIG. 2.

Figure 8:
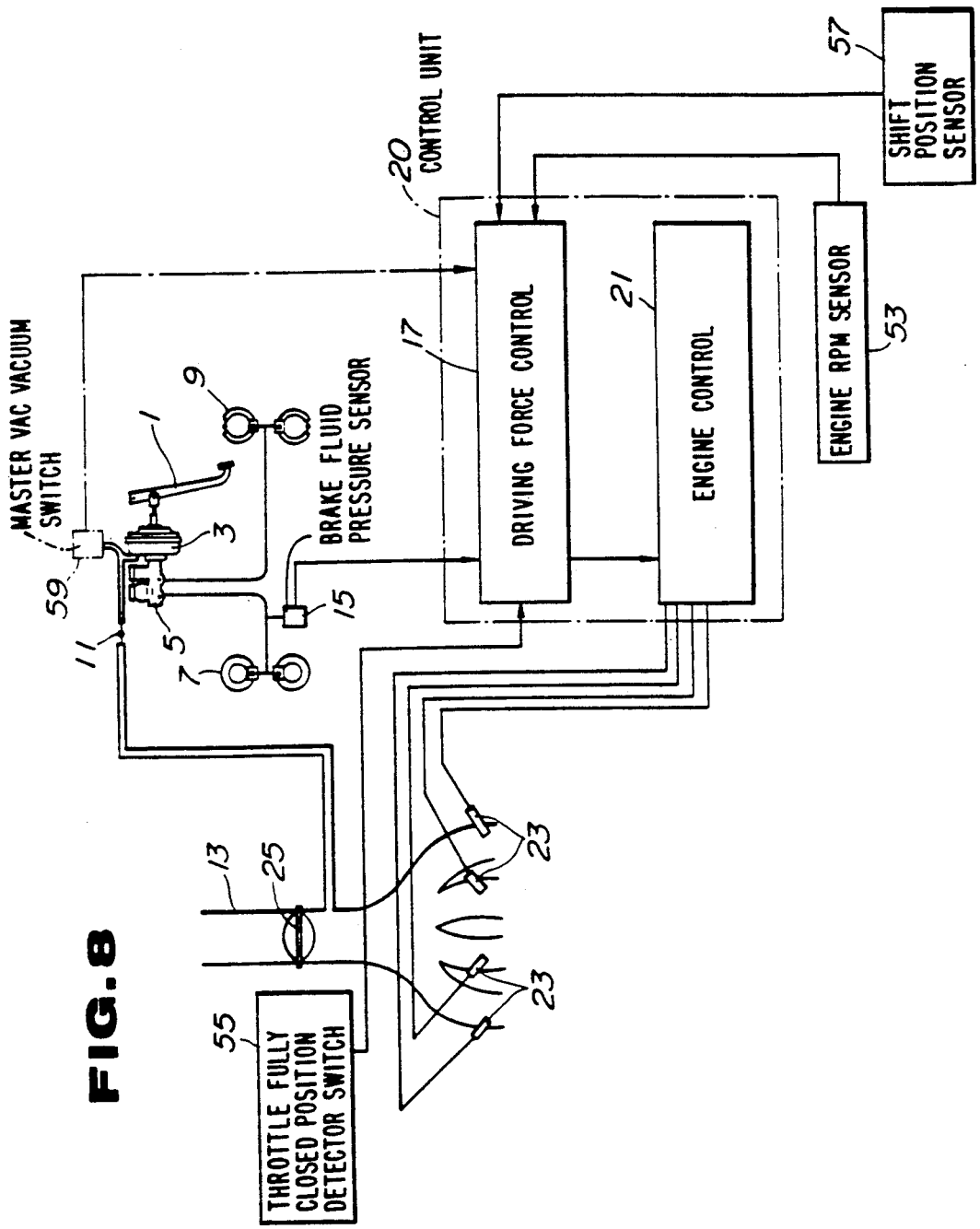
FIG. 8 is a schematic diagram of a fifth embodiment of a driving force control system according to the present invention.
Figure 9:
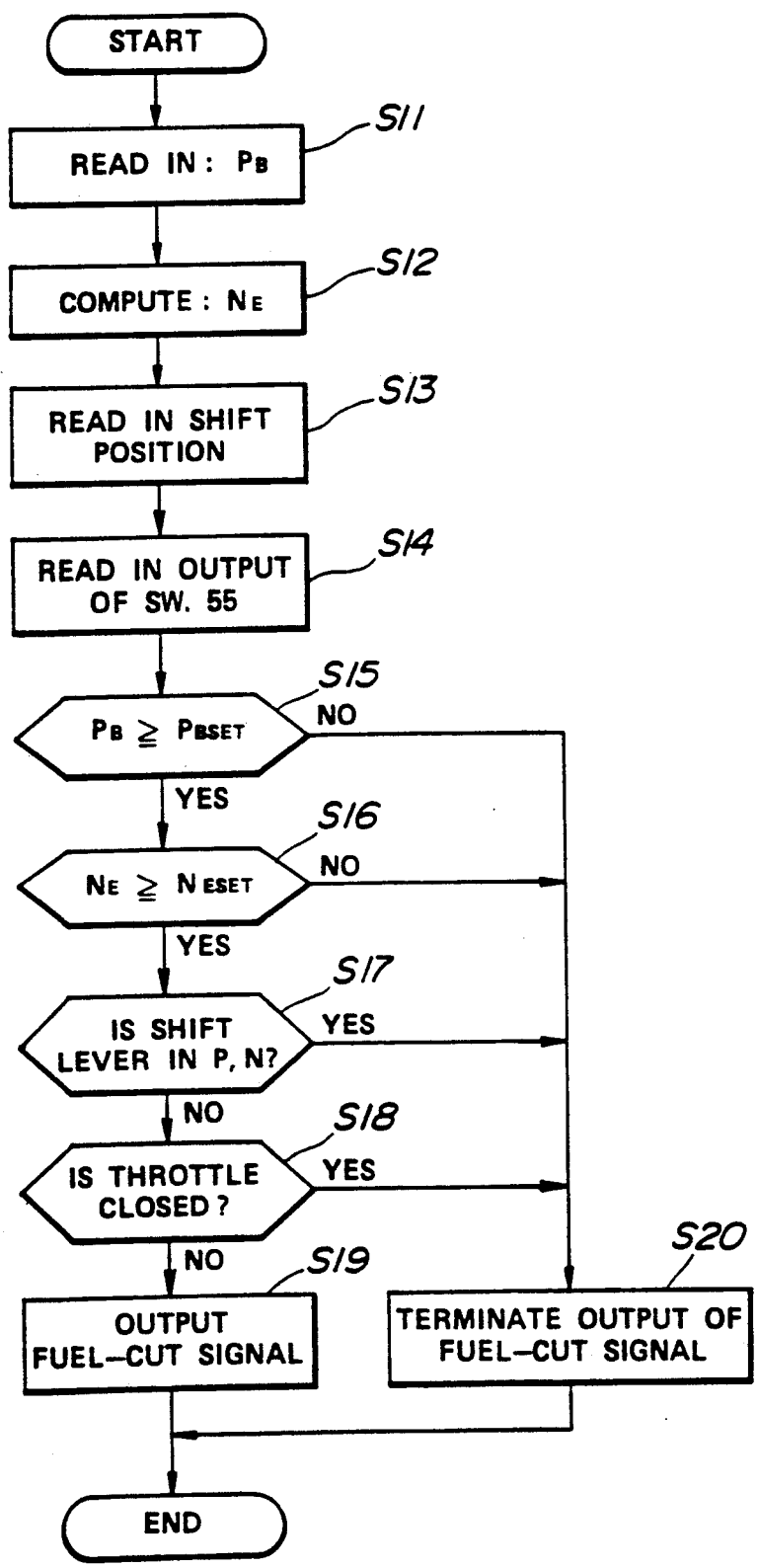
FIG. 9 is a flow chart of a control program stored in a control unit shown in FIG. 8.

Referring to FIGS. 8 and 9, a fifth embodiment of a driving force control system according to the present invention is described.

This embodiment is substantially the same as the first embodiment illustrated in FIG. 1 except the fact that the Master Vac vacuum sensor 19 has been eliminated and there are provided an engine rpm sensor 53, a throttle fully closed position detector switch 55 and a shift position sensor 57. The engine rpm sensor 53 which may be in the form of a crank angle sensor generates an output signal $M_E$ in the form of a train of pulse indicative of engine rpm. The throttle fully closed position detector switch 55 is closed to generate an output signal when engine throttle valve 25 is fully closed. The shift position sensor 57 generates an output signal indicative of a gear or shift position established in the automatic transmission of the vehicle.

The output signals of these sensors and the output signal of a brake fluid pressure sensor 15 are supplied to a control unit 20 of a microcomputer based engine control system. The microcomputer which forms a main part of the control unit 20 comprises a central processing unit (CPU), a read only memory (ROM), a random access memory (RAM) and an input output interface (I/O). The ROM of the control unit 20 of this embodiment contains a control program as illustrated by the flow chart of FIG. 9. The operation of this embodiment is described along with the flow chart of FIG. 9.

Similarly to any one of the previously described ones, the execution of this flow chart is repeated after a predetermined time has elapsed. At step S11, the output signal of the brake fluid pressure sensor 15 is converted into a digital signal and stored at a predetermined address in the RAM as information indicative of brake fluid pressure $P_B$. At step S12, using the output signal of the engine rpm sensor 53 a computation is made to give engine rpm $N_E$ which is stored at a predetermined address in the RAM. At step S13, the output signal of the shift position sensor 57 is converted into an appropriate digital form and stored at a predetermined address in the RAM as information indicative of a position selected by a shift lever of the automatic transmission. At step S14, the output signal of the throttle fully closed detector switch 55 is stored at a predetermined address in the RAM as information indicative of whether the throttle valve 25 is closed or not.

At step S15, it is judged whether the brake fluid pressure $P_B$ stored is equal to or greater than a preset brake fluid pressure value $P_{BSET}$ or not. If an answer to this inquiry is NO, the program proceeds to step S20 where no fuel-cut signal is outputted. If the answer is YES, the program proceeds to S16 where it is judged whether the engine rpm $N_E$ stored is equal to or greater than a preset engine rpm value $N_{ESET}$ or not. If an answer to this inquiry is NO, the program proceeds to the step S20. If the answer is YES, the program proceeds to step S17 where it is judged whether the shift lever of the automatic transmission is placed at P (Parking) or N (Neutral) or not. If the shift lever is placed at P or N, the program proceeds from the step S17 to step S20. If the shift lever is placed at any of drive positions and thus not at P nor N, the program proceeds to step S18 where it is judged whether the throttle valve 25 is fully closed nor not. If the throttle valve 25 is fully closed, the program proceeds from the step S18 to step S20. If the throttle valve 25 is opened, the program proceeds to step S19, where the fuel-cut signal is outputted to effect suspension of fuel injection to the engine.

It will now be understood that the fuel-cut is carried out if the following conditions are satisfied.

($P_B$ is not less than $P_{BSET}$) and ($N_E$ is not less than $N_{ESET}$) and (shift lever is not placed at P nor N) and (throttle valve is not fully closed).

According to this embodiment, if the brake pedal 1 is depressed with a relatively strong force (i.e., $P_B$ is equal to or greater than $P_{BSET}$) when the servo action by Master Vac 3 has become weak due to disappearence of intake manifold vacuum during driving with heel and toe technique, fuel-cut is carried out to cause a drop in engine rpm $N_E$ down to $N_{ESET}$, thus causing a drop in driving force for the vehicle. As a result, effective braking is assured even under this condition.

Preferably, in the case of the vehicle equipped with automatic transmission including a torque converter following the engine, the setting should be such that the preset engine rpm $N_{ESET}$ is slightly higher than a so-called stalling engine revolution speed above which the engine cannot increase its speed when the torque converter stalls. This makes it possible to keep the engine running at the above-mentioned stalled engine revolution speed with the torque converter kept in its stalling state when the vehicle is kept at a halt with the brake pedal depressed and the shift lever placed at D (Drive) range. Thus, rapid vehicle starting is possible if the brake pedal is released. Under this condition, the answer to the inquiry at step S16 is always NO so that fuel cut is never carried out.

At the previously mentioned step S15 in FIG. 9, the length of time during which the brake fluid pressure $P_B$ continues to be greater than or equal to the preset value $P_{BSET}$ is not taken into account. However, if desired, such duration of time can be taken into account in a manner similar to the FIG. 2 flow chart.

Figure 10:
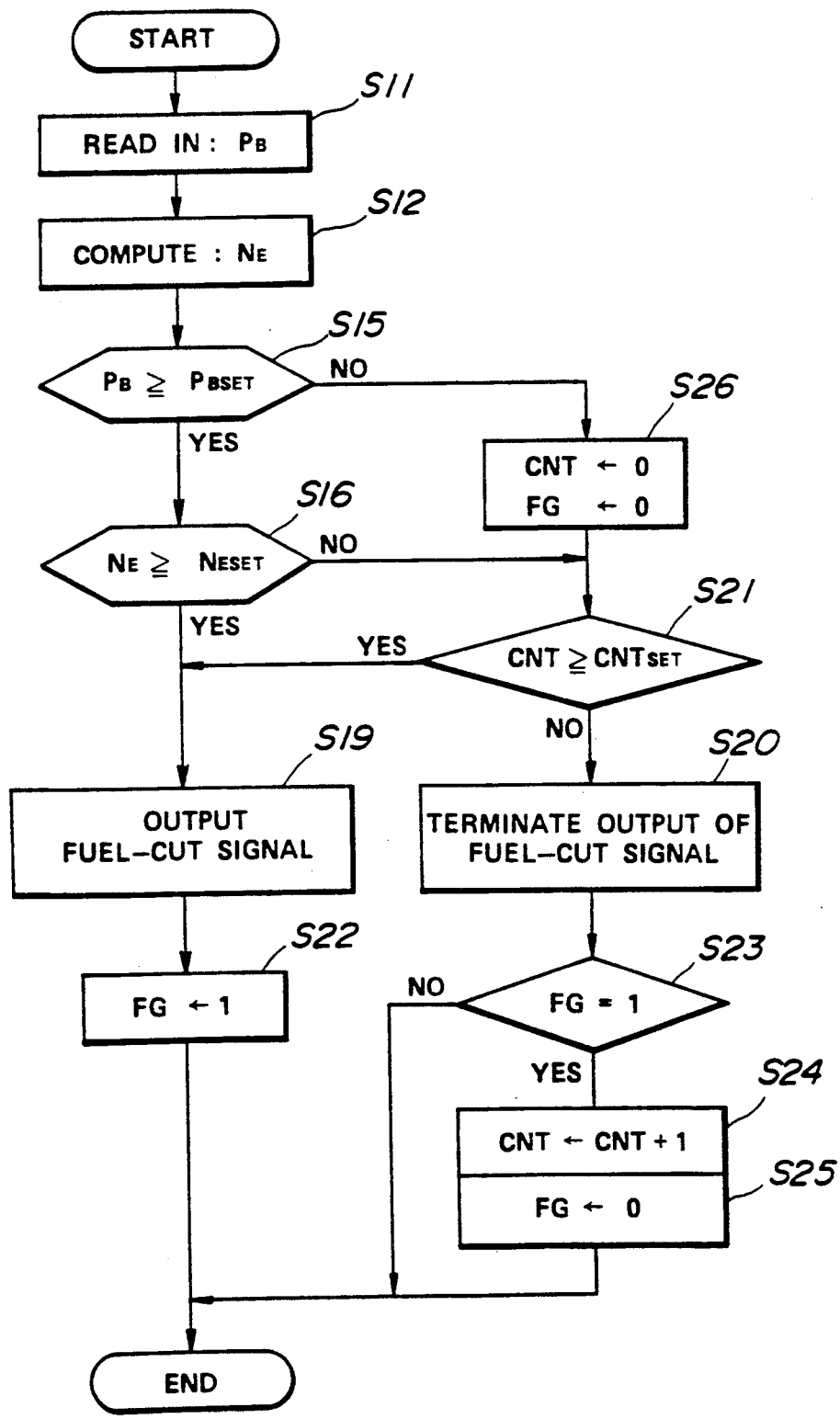
FIG. 10 is a flow chart of a control program used in a sixth embodiment of a driving force control system according to the present invention.

Referring to FIG. 10, a sixth embodiment of a driving force control system according to the present is described.

This embodiment is substantially the same as the just described fifth embodiment except the fact that a control program as illustrated by a flow chart shown in FIG. 10 is stored in the ROM instead of the control program illustrated by the flow chart shown in FIG. 9.

In the flow chart shown in FIG. 10, the read-in steps S13, S14 and the judgement steps S17, S18 are omitted for ease of illustration. If desired, these steps S13, S14, 17 and 18 may be inserted between steps S12, S15 such that if the inquiry at the step S17 is YES, the program proceeds to step S26 and if the inquiry at the step S18 is YES, the program proceeds to the step S26.

According to the previously described flow chart shown in FIG. 9, when the brake fluid pressure $P_B$ becomes greater than or equal to the preset value $P_{BSET}$ (step S15) with the engine rpm $N_E$ higher than or equal to the preset value $N_{ESET}$ (step S16) during driving with heel and toe technique, the fuel cut operation is carried out to reduce driving force to assist the brakes of the vehicle in increasing their effectiveness. However, after the brake pedal 1 has been released subsequently, the same braking effect cannot be obtained when the brake pedal 1 is depressed again with the same force exerted thereon because the Master Vac vacuum has decreased and the boost action by the Master Vac is nothing. Thus, stronger force has to be exerted on the brake pedal 1. In this case, the engine rpm $N_E$ fluctuates about the preset value $N_{ESET}$ because fuel-cut operation and resumption of fuel injection take place alternatively and frequently. In the flow chart shown in FIG. 10, this hunting of the engine rpm $N_E$ with respect to the present engine rpm value $N_{ESET}$ is monitored and whenever the number of times of resumption of fuel injection occuring after the occurrence of fuel-cut operation is counted and reaches a preset value $CNT_{SET}$, the resumption of fuel injection is prohibited to maintain fuel-cut operation until the engine stalls, thus assisting the brakes in increasing the effectiveness.

Describing along with the flow chart shown in FIG. 10, the brake fluid pressure $P_B$ and engine rpm $N_E$ are stored at steps S11 and S12, respectively. If the brake fluid pressure $P_B$ stored is greater than or equal to the preset brake fluid pressure value $P_{BSET}$ (at step S15) and at the same time the engine rpm $N_E$ stored is higher than or equal to the preset engine rpm value $N_{ESET}$ (at step S16), fuel-cut operation occurs (see step S19), causing a drop in engine rpm. If as a result of this drop, the engine rpm $N_E$ becomes lower than the preset value $N_{ESET}$, the program proceeds from step S16 to step S21 and then to step S20 where fuel-cut operation is terminated and fuel injection is resumed, causing an increase in engine rpm. If subsequently the engine rpm $N_E$ becomes higher than or equal to the preset value $N_{ESET}$ as a result of this resumption of fuel injection, fuel-cut operation takes place again. In this manner, as long as the brake fluid pressure $P_B$ is kept greater than or equal to the preset value $P_{BSET}$, the hunting of the engine rpm with respect to the preset value $N_{ESET}$ will occur. If the number of times CNT a drop in $N_E$ below $N_{ESET}$ occurs after $N_E$ has become higher than or equal to the preset value $N_{ESET}$ becomes greater than or equal to the preset value $CNT_{SET}$ (at step S21), fuel-cut operation continues because the program always proceeds along steps S16, S21 and S19 once it is judged at step 21 that CNT is greater than or equal to $CNT_{SET}$. As a result, the engine is forced to stall.

More specifically, if fuel-cut operation is initiated as a result of operation at step S19, a flag FG is set equal to 1 at step S22. Subsequently, if $N_E$ becomes less than $N_{ESET}$ and the answer to the inquiry at step S16 becomes NO, the output of fuel-cut signal is terminated at step S20. Then, since the content of flag FG is 1, the program proceeds from step S23 to step S24 where the content of CNT is increased by 1, and the flag FG is cleared at step S25. The content of CNT therefore increases if the resumption of fuel injection following the fuel-cut is repeated. If subsequently it is judged at step S21 that the content of CNT becomes greater than or equal to the preset value $CNT_{SET}$, the fuel-cut operation is kept until the engine stalls. If the brake pedal 1 is released and the brake fluid pressure $P_B$ becomes less than the preset value $P_{BSET}$, the contents of CNT and FG are cleared at step S26.

Figure 11:
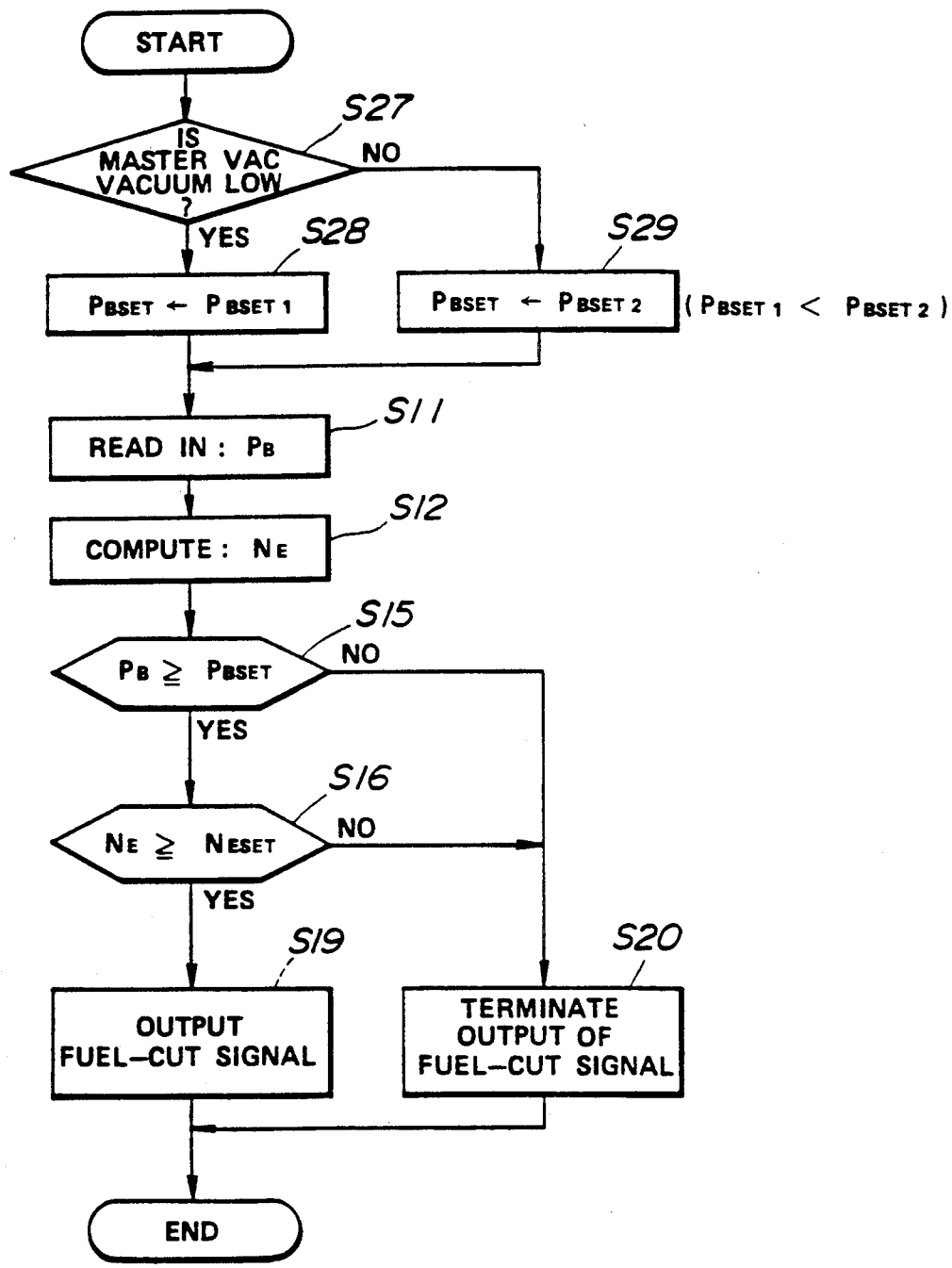
FIG. 11 is a flow chart of a control program used in a seventh embodiment according to the present invention.

Referring to FIGS. 8 and 11, a seventh embodiment of a driving force control system according to the present invention is described.

This embodiment is substantially the same as the fifth embodiment shown in FIGS. 8 and 9 except the fact that a Master Vac vacuum switch 59 as illustrated in phantom line in FIG. 8 is additionally provided and a control program as illustrated by a flow chart shown in FIG. 11 is stored in the RAM instead of the control program shown in FIG. 9. The Master Vac vacuum switch 59 is a switch which is closed when the Master Vac vacuum is lower than a preset value.

The flow chart shown in FIG. 11 is substantially the same as the flow chart shown in FIG. 9 except the provision of steps S27, S28 and S29 before the step S11. In the flow chart shown in FIG. 11, the read-in steps S13, S14 and the judgement steps S17, S18 are omitted for ease of illustration. If desired, the steps S13 and S14 may be inserted between steps S12 and S15, and the steps S17 and S18 may be inserted between steps S16 and S19 in the same manner as in FIG. 9.

Referring particularly to FIG. 11, at step S27 it is judged whether the Master Vac vacuum is lower than the preset value or not based on the output of the Master Vac vacuum switch 59. If the Master Vac vacuum is low and the Master Vac vacuum switch 59 is closed, the program proceeds to step S29 where a relatively small value $P_{BSET1}$ is set as a preset brake fluid pressure value $P_{BSET}$, whereas if the Master Vac vacuum is still high and the Master Vac vacuum switch 59 is opened, the program proceeds to step S28 where a relatively large value $P_{BSET2}$ is stored as the brake fluid pressure value $P_{BSET}$. Thus, as long as the Master Vac vacuum is high to produce an appropriate boost action, the relatively large value $P_{BSET2}$ is set as the preset brake fluid pressure value $P_{BSET}$ and this relatively large value is compared with the brake fluid pressure $P_B$ at step S15. On the contrary, when the boost action by the Master Vac 3 cannot be expected due to considerable reduction in Master Vac vacuum, the relatively small value $P_{BSET1}$ is set as the preset brake fluid pressure and this relatively small value is compared with the brake fluid pressure $P_B$ at step S15. Thus, when the boost action by the Master Vac 3 is substantially zero, the relationship between $P_B$ and $P_{BSET}$ at the step S15 is satisfied with a force exerted on the brake pedal 1 which is less strong than a force which would be required upon occurrence of a similar event in the embodiment using the flow chart shown in FIG. 9.

It is to be noted that the steps S27, S28 and S29 may be inserted before step S11 in the flow chart shown in FIG. 10.

Referring to FIGS. 12 and 12A, an eighth embodiment of a driving force control system according to the present invention is described.

Comparing FIG. 12 with FIG. 8, it will be readily understood that both of these systems are substantially the same except that a vacuum sensor 19 is additionally provided in the system shown in FIG. 12. This vacuum sensor 19 is so arranged as to measure the magnitude of Master Vac vacuum created in the Master Vac 3 and generates an output signal indicative of the Master Vac vacuum $P_V$.

According to this eighth embodiment, a control program as illustrated by a flow chart shown in FIG. 12A is stored in the ROM of a control unit 20. This flow chart is substantially the same as the flow chart shown in FIG. 9 except that new steps S30, S31, S32 and S33 are provided. Step S30 is inserted between steps S14 and S15, and steps S31, S32 and S33 are provided after step S18.

Referring particularly to FIG. 12A, the Master Vac vacuum $P_V$ is stored in the RAM via reading of the output signal of the Master Vac vacuum sensor 19. At step S31, it is judged based on the Master Vac vacuum $P_V$ stored at the RAM whether the Master Vac vacuum $P_V$ is lower than a preset value or not. If the Master Vac vacuum is low and the boost action by the Master Vac 3 is zero, the program proceeds from step S31 to step S19 to effect fuel-cut operation. If, on the contrary, the Master Vac vacuum is relatively high and the boost action by the Master Vac 3 is effective, the program proceeds to step S32 where fuel-cut operation is effected and then to step S33 where it is judged whether engine rpm $N_E$ is greater than or equal to the preset value $N_{ESET}$ or not. If an answer to this inquiry at the judgement step S33 is YES, the fuel-cut operation continues. If, however, $N_E$ is less than $N_{ESET}$ at step S33, fuel-cut operation is terminated and the fuel injection is resumed. In other words, if it is judged that the Master Vac vacuum is high enough to provide an appropriate boost action, the fuel injection is resumed when $N_E$ becomes less than $N_{ESET}$ after fuel-cut operation has been effected. The process along steps S31, S32, S33 and S20 has made it possible to start the vehicle from the state by releasing the brake pedal from the state where both the brake pedal and accelerator pedal are depressed.

Figure 14:
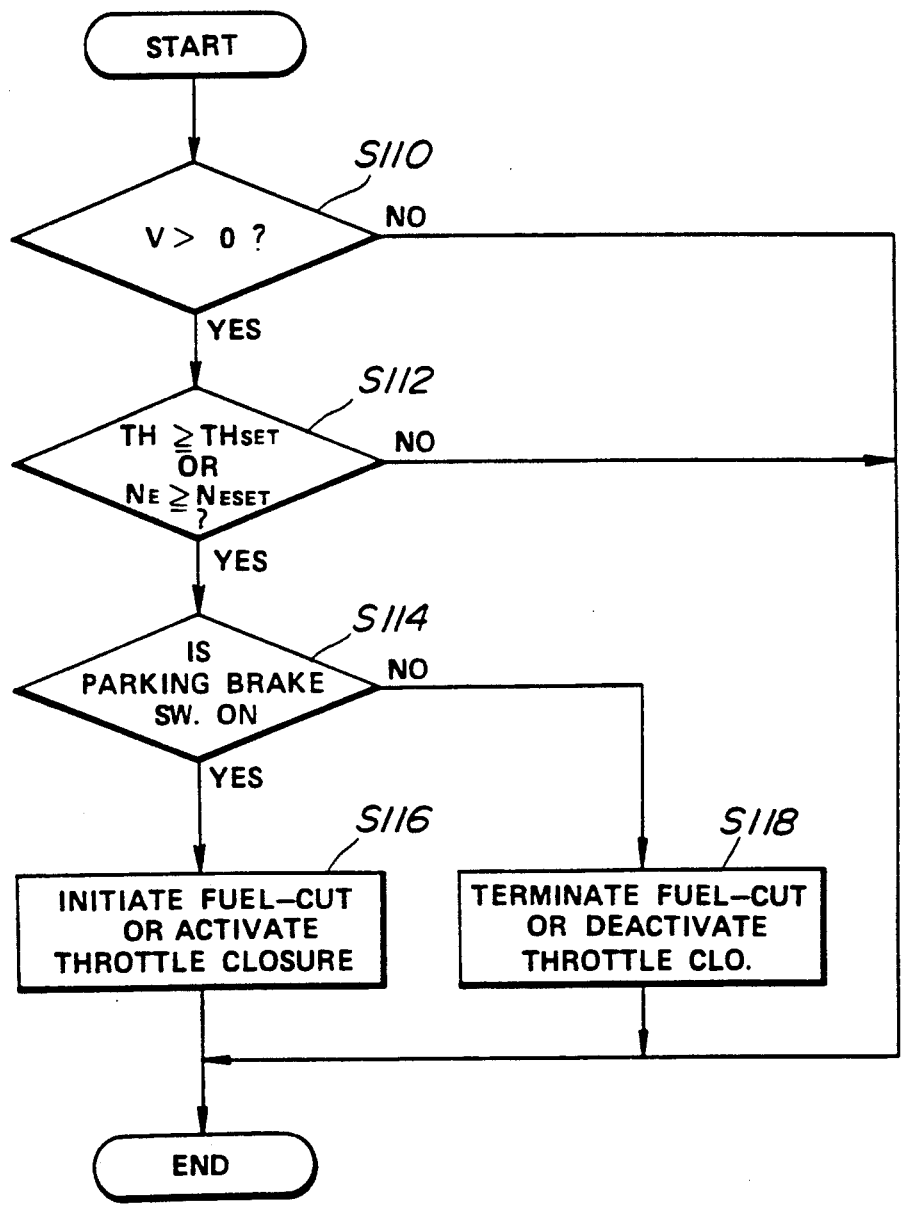
FIG. 14 is a flow chart of a control program stored in a control unit shown in FIG. 13.

Referring to FIGS. 13 and 14, a ninth embodiment of a driving force control system according to the present invention is described.

As shown in FIG. 13, the driving force control system is applied to an automotive vehicle which includes an engine 80 with an intake manifold 13, a transmission 82, front wheels 84, rear wheels 86, a steering wheel 88, and a parking brake, not shown. The engine 80 is of the fuel injection type and provided with fuel injectors 23 and a throttle valve 25.

In this embodiment, a vehicle speed sensor 100 is provided which measures the revolution speed of the transmission output shaft of generate an output signal indicative of vehicle speed V. A parking brake switch 102 is provided to detect whether the parking brake is operated or not. This parking switch 102 is a switch which is closed when the parking brake is operated. A throttle opening degree sensor 51 is provided to measure the opening degree of the throttle valve 25 and generate an output signal indicative of the throttle opening degree TH measured. An engine speed sensor 53 in the form of a crank angle sensor is provided which generates a train of pulses indicative of the revolution speed of the engine crankshaft, i.e., the engine rpm $N_E$.

The output signals of the sensors 51, 53 and 100 and the output of the parking brake switch 102 are supplied to a control unit 20 of a microcomputer based engine control system. The control unit 20 is substantially the same as any one of the preceding embodiments and thus include a central processing unit (CPU), a read only memory (ROM), a random access memory (RAM) and an input output interface (I/O). The ROM of this control unit 20 stores a control program as illustrated by a flow chart shown in FIG. 14. The operation of this embodiment is described along with the flow chart shown in FIG. 14.

Referring to FIG. 14, there have been omitted steps at which output signals of the vehicle speed sensor 100, throttle opening degree sensor 51, engine speed sensor 53 and parking brake switch 102 are stored as information indicative of vehicle speed V, throttle opening degree TH, engine speed $N_E$ and an operating state of the parking brake, respectively. These steps may be inserted in the flow chart shown in FIG. 14 before step S110.

At step S110, it is judged whether the vehicle speed V stored is greater than 0 (zero) or not to determine whether the vehicle is running or not. If the vehicle speed V is greater than 0, the program proceeds to step S112 where a judgement is made whether the throttle valve opening degree TH is greater than or equal to a preset value $TH_{SET}$ or not. Alternatively, a judgement may be made at step S112 whether the engine rpm $N_E$ is greater than or equal to a preset value $N_{ESET}$ or not. If an answer to the inquiry at the step S112 is YES, the program proceeds to step S114 where it is judged based on the output of the parking brake switch 102 whether the parking brake is operated or not. If the parking brake is operated, fuel-cut is initiated and injection of fuel via the fuel injectors 23 is suspended at step S116 thereby to decrease the output of the engine. Alternatively, a throttle closure 120 (see FIG. 13) may be actuated to close the throttle valve 25 thereby to decrease the output of the engine. If it is judged at step S114 that the parking brake is not operated, fuel-cut is terminated at step S118 to resume or continue fuel injection via the fuel injectors 23. Alternatively, the throttle closure 120 may be deactivated to allow the throttle valve to resume its original position.

From the previous description of this embodiment, it may now be understood that the function of the parking brake to keep the vehicle at a halt is assisted by decreasing the output of the engine.

In any of the previously described embodiments in connection with FIGS. 1 to 12A, a brake fluid pressure sensor 15 has been used as a means for detecting the operating state of a brake pedal 1. Alternatively, a brake pedal stroke sensor or a brake pedal exerting force sensor or a brake fluid pressure switch which is closed when brake fluid pressure exceeds a preset value may be used.

In any of the previously described embodiments in connection with FIGS. 1 to 12A, the injection of fuel has been suspended by effecting a so-called fuel-cut operation in order to cause a reduction in driving force. Alternatively, the ignition timing of the engine may be retarded to cause a reduction in driving force.

Although the brake system employed by the previously described embodiments uses a Master Vac as a brake booster the invention may be applied to an automotive vehicle with a brake system including as a brake booster an air booster or a hydraulic booster.

What is claimed is:

1. A driving force control system for an automotive vehicle including an engine with an engine power control system including a throttle valve operable by an accelerator pedal, the engine being operative to exert a driving force on the vehicle in response to operation of the accelerator pedal, and a brake system with a brake pedal, comprising:

measuring means for measuring a predetermined variable indicative of a state of the brake system and generating an output signal indicative of said predetermined variable; and driving force reducing means for reducing the driving force exerted on the vehicle upon a predetermined condition being fulfilled after said output signal has indicated a predetermined operating state of the brake system even when the accelerator pedal is operated.

2. A driving force control system as claimed in claim 1, wherein said measuring means include sensor means for detecting a brake fluid pressure in the brake system as said predetermined variable and for generating as said output signal a brake fluid pressure indicative signal indicative of said detected brake fluid pressure.

3. A driving force control system as claimed in claim 2, wherein said measuring means include sensor means for detecting a vacuum on which a brake booster of the brake system operates and for generating a brake booster vacuum indicative signal indicative of said detected vacuum, and a memory means for storing a retrieveable map containing data, each datum indicating a preset value as a function of said vacuum, and a processing unit which determines a preset value after retrieving said retrieveable map based on said brake booster vacuum indicative signal and for comparing said brake fluid pressure indicative signal with said preset value determined thereby.

4. A driving force control system as claimed in claim 2, wherein said engine comprises an internal combustion engine, and said driving force reducing means include sensor means for detecting a second predetermined variable indicative of an output of the internal combustion engine of the vehicle and a memory means for storing a retrievable map containing data, each datum indicating a preset value as a function of said output of the internal combustion engine, and a processing unit which determines a second preset value after retrieving said retrievable map based on said detected second predetermined variable and for comparing said brake fluid pressure indicative signal with said second preset value determined thereby.

5. A driving force control system as claimed in claim 4, wherein said second predetermined variable is a throttle opening degree of the throttle valve.

6. A driving force control system as claimed in claim 2, wherein said measuring means include sensor means for detecting a vacuum on which a brake booster of the brake system operates and for generating a vacuum indicative signal indicative of said detected vacuum, and a memory means for storing at least two preset values, and a processing unit which determines one out of said two preset values in response to said vacuum indicative signal and for comparing said brake fluid pressure indicative signal with said preset value determined thereby.

7. A driving force control system as claimed in claim 1, wherein said driving force reducing means include means for effecting a fuel-cut operation to suspend fuel injection into the engine of the vehicle.

8. A driving force control system as claimed in claim 1, wherein said driving force reducing means include means for opening a waste gate of a turbo charger of the engine of the vehicle.

9. A driving force control system as claimed in claim 1, wherein said driving force reducing means include sensor means for detecting a revolution speed of the engine and for generating an engine revolution speed indicative signal indicative of said detected revolution speed and a processing unit for comparing said engine revolution speed indicative signal with a preset value.

10. A driving force control system as claimed in claim 9, wherein said predetermined condition involves that the engine revolution speed is greater than or equal to said preset value.

11. A driving force control system as claimed in claim 10, wherein said driving force reducing means cease to operate for reducing the driving force when said engine revolution speed indicative signal becomes less than said preset value.

12. A driving force control system as claimed in claim 10, wherein said driving force reducing means operate to effect a fuel-cut operation to stop fuel injection to the engine of the vehicle until the engine stalls when said engine revolution speed indicative signal fluctuates with respect to said preset value.

13. A driving force control system as claimed in claim 1, wherein said measuring means include first sensor means for detecting a vacuum on which a brake booster of the brake system operates and for generating a brake booster vacuum indicative signal indicative of said detected vacuum and said driving force reducing means including second sensor means for detecting a revolution speed of the engine and for generating an engine revolution speed indicative signal indicative of said revolution detected speed, and wherein said driving force reducing means cease to operate for reducing the driving force when said engine revolution speed indicative signal becomes less than a preset value while said brake booster vacuum indicative signal is higher than a preset value.

14. A driving force control system as claimed in claim 1, wherein said measuring means include means for detecting as said predetermined variable whether or not a parking brake of the brake system is operated and for generating as said output signal a parking brake operation indicative signal when said parking brake of the brake system is operated.

15. A driving force control system as claimed in claim 14, wherein said driving force reducing means include sensor means for detecting a throttle opening degree of the throttle valve and for generating an engine throttle opening indicative signal indicative of said detected throttle opening degree.

16. A driving force control system as recited in claim 1, wherein said driving force reducing means includes means for detecting a condition wherein the brake pedal is operated for a time exceeding a predetermined threshold value.

17. In an automotive vehicle:
an engine with an accelerator pedal, the engine being operative to exert a driving force on the vehicle when said accelerator pedal is operated;
an automatic transmission drivingly connected to said engine;
a brake system with a brake pedal;
means for measuring a predetermined variable indicative of a state of the brake system and generating an output signal indicative of said predetermined variable; and
means for forcing said automatic transmission to shift to a predetermined gear position having the smallest gear ratio upon a predetermined condition being fulfilled after said output signal has indicated a predetermined operating state of said brake system, whereby said driving force exerted on the vehicle is reduced even when the accelerator pedal is operated if the automatic transmission is conditioned in a gear position having a gear ratio larger than the smallest gear ratio.

18. In an automotive vehicle:
an engine including a throttle valve operable by an accelerator pedal, said engine being operative to exert a driving force on the vehicle when said accelerator pedal is depressed;
detecting means for detecting a throttle opening degree of said throttle valve and for generating a throttle opening degree indicative signal indicative of the detected throttle opening degree;
a brake system with a brake pedal and a parking brake;
detecting means for detecting an operating state of said parking brake and for generating a parking brake operation indicative signal when said parking brake is activated; and
driving force reducing means for reducing said driving force exerted on the vehicle when said throttle opening degree indicative signal is greater than a predetermined value after generation of said parking brake operation indicative signal.

19. A method of controlling a driving force exerted on an automotive vehicle including a brake system and an internal combustion engine, said method comprising the steps of:
detecting an operating state of the brake system;
detecting an operating state of the engine;
controlling fuel supply to the engine in response to said operating state of the engine to exert a driving force on the vehicle; and
suspending fuel supply to the engine thereby to reduce the driving force exerted on the vehicle when said detected operating state of the brake system indicates a brake demand even when said detected operating state of the engine indicates a power demand.

20. A method of controlling a driving force exerted on an automotive vehicle including a brake system and an internal combustion engine, said method comprising the steps of:
detecting a power demand on the engine;
detecting an operating state of the brake system;
controlling fuel supply to the engine in response to said power demand detected thereby to exert a driving force on the vehicle; and
suspending fuel supply to the engine thereby to reduce the driving force exerted on the vehicle when said detected operating state of the brake system indicates a brake demand together with detection of power demand on the engine, thereby to overcome a reduction in braking power resulting from substantially simultaneously operating the brake system and demanding power on the engine.

21. A method of controlling a driving force exerted on an automotive vehicle including a brake system with a brake pedal and an internal combustion engine, said method comprising the steps of:
detecting a power demand on the engine;
detecting an operating state of the brake pedal;
controlling fuel supply to the engine in response to said detected power demand, thereby to exert a driving force on the vehicle; and
suspending fuel supply to the engine thereby to reduce the driving force exerted on the vehicle when the detected operating state of the brake pedal indicates a brake demand even when the power demand on the engine is detected.

22. A method of controlling a driving force exerted on an automotive vehicle including a brake system with a parking brake and an internal combustion engine, said method comprising the steps of:
detecting a power demand on the engine;
detecting an operating state of the parking brake of the brake system;
controlling fuel supply to the engine in response to said detected power demand, thereby to exert a driving force on the vehicle; and
suspending fuel supply to the engine thereby to reduce the driving force exerted on the vehicle when said detected operating state of the parking brake indicates a brake demand together with detection of a power demand on the engine.

23. A method of controlling a driving force exerted on an automotive vehicle including a brake system with a brake pedal and a parking brake and an internal combustion engine, said method comprising the steps of:
detecting a power demand on the engine;
detecting an operating state of the parking brake;

controlling fuel supply to the engine in response to said detected power demand on the engine thereby to exert a driving force on the vehicle; and suspending fuel supply to the engine thereby to reduce the driving force exerted on the vehicle when the detected operating state of the brake system indicates a brake demand together with detection of a power demand on the engine.

24. A method of controlling a driving force exerted on an automotive vehicle including a brake system with a brake pedal and a parking brake and an internal combustion engine, said method comprising the steps of:

detecting an operating state of the parking brake;
detecting an operating state of the engine;
detecting whether or not the vehicle is moving;
controlling fuel supply to the engine in response to said detected operating state of the engine thereby to exert a driving force on the vehicle; and
suspending fuel supply to the engine thereby to reduce the driving force exerted on the vehicle when said detected operating state of the parking brake indicates a brake demand and it is detected that the vehicle is moving and when said detected operating state of the engine detected indicates a power demand on the engine.

25. A driving force control system for an automotive vehicle including an engine with an engine power control system including an accelerator pedal, the engine being operative to exert a driving force on the vehicle when the accelerator pedal is depressed, and a brake system with a brake pedal, comprising:

means for measuring a predetermined variable indicative of a state of the brake system and generating an output signal indicative of said predetermined variable measured thereby; and means for reducing the driving force exerted on the vehicle upon a predetermined condition being fulfilled after said output signal has indicated a predetermined operating state of said brake system even when the accelerator pedal is depressed.

26. A driving force control system for an automotive vehicle as recited in claim 25, wherein said driving force reducing means is operative to reduce a quantity of fuel supplied to the engine of the automotive vehicle, whereby fuel supplied to the engine is reduced upon operation of the brake system even while the accelerator pedal is depressed.

27. In an automotive vehicle:

an engine including a throttle valve operable by an accelerator pedal, said engine being operative to exert a driving force on the vehicle when said accelerator pedal is actuated;

means for detecting a revolution speed of said engine and for generating an engine revolution speed indicative signal indicative of said detecting revolution speed;

a brake system with a brake pedal and a parking brake;

means for detecting an operating state of said parking brake and for generating a parking brake operation indicative signal when said parking brake is activated; and means for reducing said driving force exerted on the vehicle when said engine revolution speed indicative signal is greater than a predetermined value after said parking brake operation indicative signal has been generated.

* * * * *